United States Patent [19]

Hopkins

[11] 3,949,566
[45] Apr. 13, 1976

[54] PURGE ARRANGEMENT FOR ABSORPTION REFRIGERATION SYSTEMS

[75] Inventor: Neil E. Hopkins, York, Pa.

[73] Assignee: Borg-Warner Corporation, Chicago, Ill.

[22] Filed: Aug. 1, 1974

[21] Appl. No.: 493,579

[52] U.S. Cl. .................................. 62/475; 62/112
[51] Int. Cl.² ........................................ F25B 43/00
[58] Field of Search ...................... 62/112, 475, 476

[56] References Cited
UNITED STATES PATENTS

| | | | |
|---|---|---|---|
| 3,081,605 | 3/1963 | Leonard, Jr. | 62/112 X |
| 3,276,217 | 10/1966 | Bourne et al. | 62/112 X |
| 3,301,005 | 1/1967 | Eisberg | 62/112 X |
| 3,360,950 | 1/1968 | Osborne | 62/475 X |
| 3,367,134 | 2/1968 | Bourne | 62/475 |
| 3,367,135 | 2/1965 | Greacen et al. | 62/475 |
| 3,452,550 | 7/1967 | Dyre et al. | 62/475 X |
| 3,597,936 | 8/1971 | Dyre et al. | 62/475 X |

*Primary Examiner*—William E. Wayne
*Attorney, Agent, or Firm*—Thomas B. Hunter

[57] ABSTRACT

A purge arrangement for absorption refrigeration systems using a solution of lithium bromide as an absorbent and water as a refrigerant, and a heat transfer additive, such as octyl alcohol being added to and mixing with the lithium bromide solution. The purge arrangement includes means for automatically removing noncondensible gases or vapor from the system, said means including a vacuum pump connected to a receiver to draw noncondensible gases therefrom; automatic electrical control means for said vacuum pump; and an additive overflow conduit to prevent additive collecting in the storage receiver and to assure additive return flow into the solution conduit.

10 Claims, 5 Drawing Figures

PURGE ARRANGEMENT FOR ABSORPTION REFRIGERATION SYSTEMS

BACKGROUND AND SUMMARY OF THE INVENTION

This invention relates to absorption refrigeration systems and more particularly to an improved purge arrangement for removing noncondensible gases or vapors fron an absorption refrigeration system employing an additive, such as octyl alcohol, in the system.

Various types of refrigeration systems, and particularly absorption refrigeration systems using lithium bromide solution for absorption of refrigerant vapor, require noncondensible gases be removed from the absorber region of the system to maintain its operating efficiency, since the presence of noncondensible gases, even in small quantities, seriously reduce refrigeration capacity by tending to blanket the absorber solution and substantially reduce the quantity of refrigerant vapor which is absorbed, causing the pressure in the absorber, and hence in the evaporator, to rise with consequent reduction of evaporation of refrigerant and cooling capacity. Purge arrangements for removing noncondensible gases from absorption refrigeration systems are known to the art, the simplest and least expensive arrangements employing a vacuum pump to expel these gases from the system.

It is common practice in the art of absorption refrigeration to add a quantity of octyl alcohol (2-ethyl-n-hexanol) to an absorption refrigeration system to improve the performance of the absorber and condenser and to thereby substantially increase the over-all capacity of the system. However, octyl alcohol is volatile and exists partially in a gaseous state in the absorber. Accordingly, it is possible for the octyl alcohol gas to be removed from the system by the purge pump, with consequent loss of capacity of the system. Also, it is possible to lose refrigeration capacity because of the tendency of the alcohol to settle out in certain locations in the absorption system it is not circulated with the absorbent or refrigerant and where it is apparently inhibited from entering into the gaseous phase, due to the limited solubility of the octyl alcohol in both the refrigerant (water) and in the aqueous lithium, bromide solution. Accordingly, the alcohol exists in a partially undissolved liquid phase in the system and, because its specific gravity is less than that of either water or the solution, the alcohol floats on the surface of these liquids and accumulates in sumps or other portions of the system where its usefulness is diminished.

The present invention is directed to, and has for its principal object, an improved purge arrangement for absorption refrigeration systems including means for purging noncondensible gases from the system while maintaining the presence of octyl alcohol in the system. In describing the system, reference will be made herein to a typical absorption refrigeration machine in which the generator and condenser are arranged in one shell, and the evaporator and absorber are arranged in another shell. It is obvious, however, that absorption refrigeration machines may take many other forms and the description should not necessarily be restricted to the particular arrangement described. Also, while the specification refers to an absorption refrigeration system of the type using lithium bromide as the absorbent solution, many other absorbent-refrigerant combinations are known; and it is not intended that the invention be limited to this particular system.

Other objects and advantages of the invention will be apparent from the following detailed description of a preferred embodiment thereof when taken in conjunction with the drawings.

DESCRIPTION OF THE PREFERRED EMBODIMENT

Figure 1:
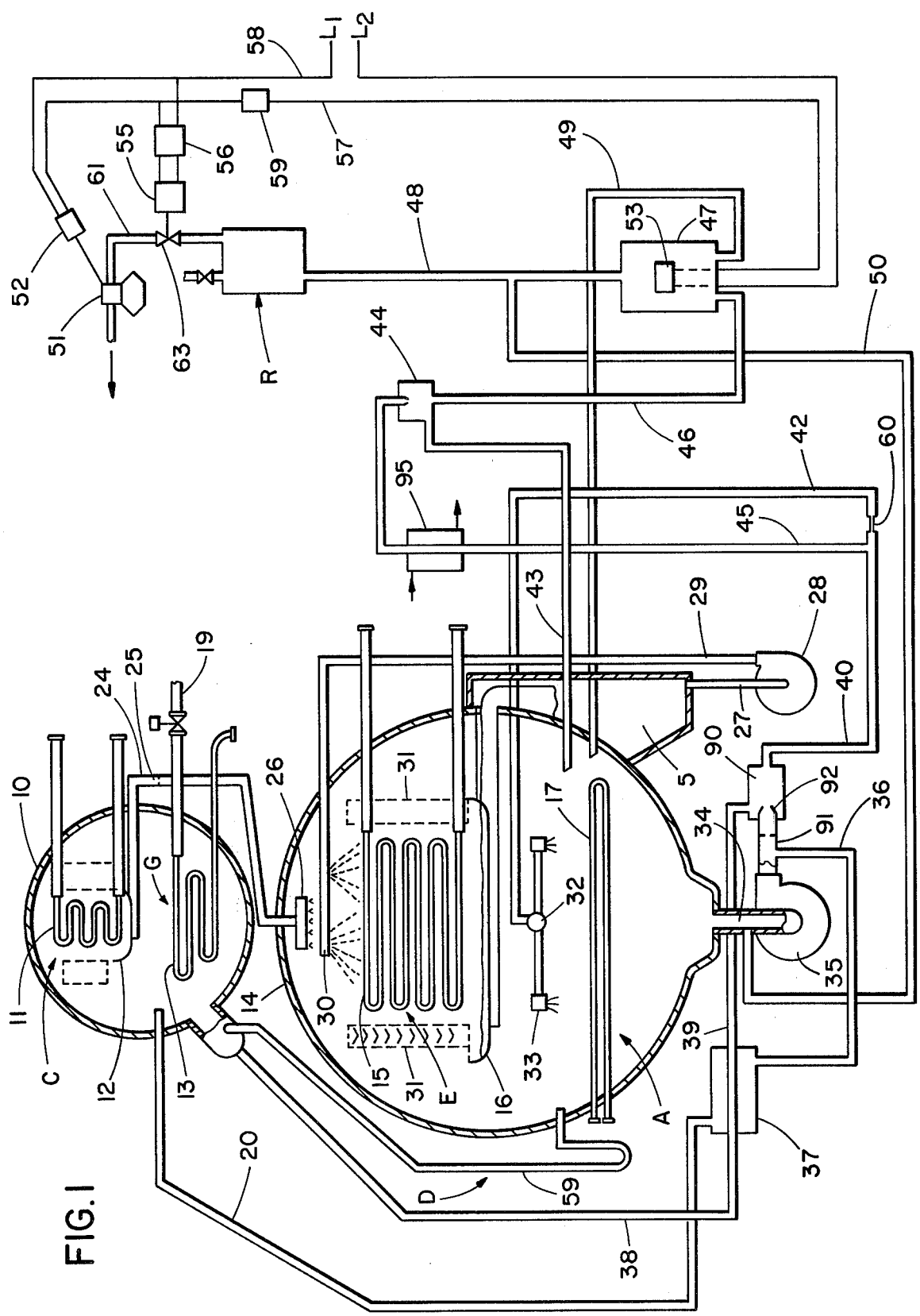
FIG. 1 of the drawings is a diagrammatic view, partially in cross section, of an absorption refrigeration system incorporating the purge arrangement of the present invention.

The absorption refrigeration machine is shown as arranged in a twin shell configuration. The upper shell 10 includes a tube bundle 11 which cooperates with a pan 12 to provide a condenser C; and a second tube bundle 13 cooperates with the lower portion of shell 10 to provide a generator G. In the lower shell 14, tube bundle 15 is arranged above a pan 16, both of which cooperate to provide an evaporator E; and a fourth tube bundle 17, located underneath pan 16, is associated with the absorber A.

As is well understood by those skilled in the art, the operation of an absorption refrigeration machine depends on a refrigerant that boils at a temperature below that of a liquid being chilled and an absorbent possessing great affinity for the refrigerant. In the particular system to be described, the refrigerant is water and the absorbent is an aqueous solution of a hygroscopic salt such as lithium bromide.

It is desirable to add a quantity of octyl alcohol (2-ethyl-n-hexanol) to the absorption refrigeration system in order to improve the performance of the absorber and condenser and to increase the capacity of the system. More particularly, the addition of the octyl alcohol creates a turbulent film on the exterior of the absorber tubes, which film provides better heat transfer than a laminar film on the absorber tubes. In any event, a substantial increase in absorption of refrigerant occurs when octyl alcohol is added to the absorber section of the absorption machine employing a lithium bromide absorbent solution. Also, the addition of octyl alcohol improves purging of relatively noncondensible gases from the absorption machine, and also promotes dropwise condensation of refrigerant vapor on the surfaces of the condenser tubes resulting in improved condenser heat transfer.

While some absorption machines actually circulate the refrigerant directly to a load, the apparatus illustrated herein uses a secondary heat exchange medium (usually water) which is chilled in the evaporator by indirect contact with the refrigerant in heat exchanger 15 and then circulated to and from the load.

The generator G, the condenser C, the evaporator E and the absorber A are all connected to provide a closed circuit, continuous cycle refrigeration system. Relatively dilute (about 59percent LiBr by weight) absorbent solution is circulated to the generator G through conduit 20 where it contacts tube bundle 13, to which a heating medium, such as steam or hot water, is supplied through conduit 19. Under the pressure conditions existing in the upper shell (about 1/10 atmosphere) the solution boils, releasing water vapor and concentrating the solution. The water vapor boiled off in the generator flows upwardly to the condenser C where the vapor is brought into contact with tube bundle 11 through which cooling water (from a cooling water tower or the like) is circulated. The refrigerant, condensing on the tube bundle, is collected in pan 12 and forwarded through conduit 24, which contains an orifice 25 to maintain the proper pressure differential between the shells, to a refrigerant distributor 26 located above the evaporator. The refrigerant discharged from distributor 26, mostly liquid but containing some water vapor, flows downwardly in contact with the evaporator tube bundle 15, commonly referred to as the chilled water coil, where it boils and abstracts heat from the water circulating therethrough, dropping the temperature from approximately 54°F. as it is normally returned from the load (at full capacity) to approximately 44°F. Unevaporated refrigerant collects in pan 16 and flows through a compartment or sump 5 on one side of the lower shell and conduit 27 to the inlet side of refrigerant pump 28. From there, it is circulated back to the evaporator through conduit 29 and spray header 30 positioned above the chilled water coil 15. The water vapor formed in the evaporator by contact with the chilled water coil passes through eliminators 31, employed to reduce the amount of liquid refrigerant carried into the absorber, and sweeps downwardly into the absorber section A where it is absorbed in the solution, the heat of solution being removed by contact with the absorber tube bundle 17.

As the water vapor is dissolved in absorbent solution, the solution naturally becomes more dilute and is withdrawn through conduit 34 to the inlet side of solution pump 35. A portion of the relatively dilute solution is forwarded via line 36 to a solution heat exchanger 37 where it is brought into indirect heat exchange relation with the hot, concentrated solution passing from the generator through conduit 38. The relatively concentrated solution is cooled through an appreciable range, withdrawn from solution heat exchanger 37 through conduit 39, and introduced into the inlet side of an ejector 90 where it mixes with another portion of dilute solution from the discharge side of pump 35 through line 91 and ejector nozzle 92 to form an intermediate (62–63 percent LiBr) strength solution. This is taken off through lines 40 and 42 and delivered to the absorber spray header 32. This intermediate strength solution of lithium bromide is continuously distributed through nozzles 33 over the absorber tube bundle 17, which is also supplied with cooling water from a tower (not shown) and usually connected in series with the condenser coil 13.

The system is provided with a conventional automatic decrystalizing device D in the form of a tube 59 extending between and connecting the generator G to the shell 14 to return solution to the absorber A, the tube having a J-portion serving as a trap. A more complete description of this feature is found in U.S. Pat. No. 3,410,104 issued Nov. 12, 1968.

The present invention is more particularly directed to a purge arrangement which provides for retention of the heat transfer additive in the system. The purge arrangement comprises an eductor device 44 having a chamber with one side connected to the shell 14 by a conduit 43 for the purpose of removing gases and vapor from the absorber A. A conduit 45 is connected to the eductor device 44 and conduit 42 to direct solution, forced by the pump 41 from absorber A, into the nozzle portion of the eductor device, consequent eductor action causing the liquid solution to draw the gases and vapor from absorber A through conduit 43 into the chamber of the device, the liquid solution, gas, and vapor mixture then flowing downwardly in tube 46 to a separation chamber of a container 47. Line 45 should also be provided with a heat exchanger 95, supplied with cooling tower water, to reduce the temperature of solution flowing to the eductor nozzle.

It will be observed that the vapor and gas is moved into the container 47 not only by eductor action, but since the liquid solution and vapor and gas flow in tube 46 is downward, there is also drop tube action. The tube 46 has its lower end bent to curve upwardly to enter the bottom of container 47 providing a vapor and gas trap. The water vapor removed from the absorber is condensed in the container 47 and any noncondensible vapors or gases rise vertically in a conduit or column 48 into a receiver shell R. The solution flows from the separation chamber of container 47 though conduit 49 into the absorber A, the conduit 49 extending downwardly from the bottom of the container, vertically upwardly, and horizontally over the container for connection to the absorber. Thus, conduit 49 provides a trap because the outlet of the conduit is appreciably above the level of the lowest part of the conduit proceeding from the separation chamber 47 with the result that a pressure is built up in the receiver R appreciably above the absorber pressure. An overflow conduit 50 is connected to the conduit 48 and to the conduit 40 for a purpose to be later described. The conduit 42 is provided with a restriction to the solution flow from the pump 41 to the absorber in the form of an orifice 60 to insure flow of the solution from the pump 41 into the conduit 45.

A purge pump 51 is connected to the receiver R by line 61 and is driven by a motor 52. An electrically-operated (or manual) valve 63 is provided to prevent back flow leakage of air when the pump is inoperative. A float switch 54 can be located in the separation chamber 47 and may be used to either indicate a visual signal when manual purging is required, or, as shown, the float switch can be employed in an electrical control circuit to energize a solenoid 55 for operating valve 63 and to energize the motor 52 of the purge pump 51. A time delay relay 56 and a timer 59 may also be included as described in more detail below.

OPERATION

FIGS. 2 to 5 inclusive illustrate, in somewhat schematic form, the various phases of operation of the purge arrangement. Shell 14 is broken open to show the several different liquid levels of the solution and octyl alcohol additive mixture in the absorber A, it being understood that the separating chamber 47, pumps and the various conduits are located outside shell 14.

Figure 2:
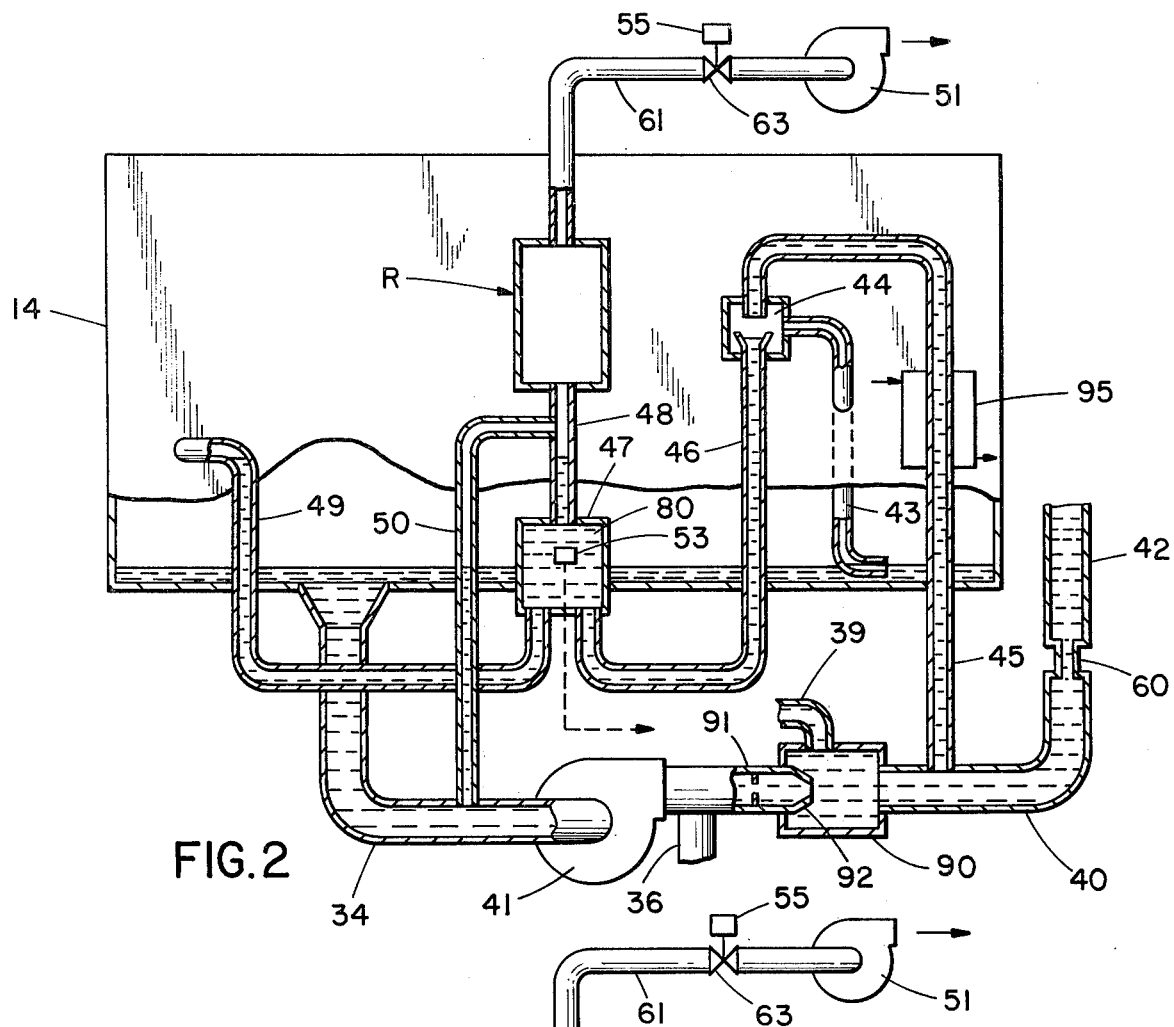
FIGS. 2–5, inclusive, are views, in simplified form, of the purge arrangement shown in FIG. 1, for illustrating various phases of its operation.

FIG. 2 shows the level of the solution in the shell 14, the separation chamber and in the various conduits, under conditions when there is no buildup of noncondensible vapors or gases in the receiver. The pressure in the receiver R is the same as in the absorber A. It will be observed the levels of the mixture are balanced in all trap sections so that the level in the column or conduit 48 is the same as the outlet of conduit 49, and the level in the additive overflow conduit 50 is the same as in the absorber A.

In the employment of octyl alcohol as an additive in a refrigeration system using water or the refrigerant and an aqueous solution of lithium bromide as an absorbent, there is a tendency of the alcohol to separate in certain locations in the system where it is not circulated with the absorbent or refrigerant and where it is inhibited from entering into the vapor phase and may be trapped or purged from the system so that it is prevented from performing its intended function of increasing the capacity of the system. This problem occurs since the octyl alcohol additive has only limited solubility in both the refrigerant water and in an aqueous lithium bromide solution, and the alcohol thus exists in a partially undissolved liquid phase in the system. An additional factor is that, since the specific gravity of octyl alcohol is substantially less than that of either water or the aqueous lithium bromide solution in the refrigeration system, the octyl alcohol floats on the surface of the water and solution. Accordingly, the alcohol is not readily entrained or mixed in liquids circulated through the system and the disparity in their specific gravities further increases the problem of accumulation of the alcohol in sumps and other locations in the system preventing it serving a useful purpose.

In FIG. 2, the solution and vapor, flowing through the eductor device 44, contains the octyl alcohol (2-Ethylhexanol) additive, and the separation chamber tends to separate the additive at the same time the noncondensible gases or vapors are separated. The additive and the noncondensible vapors flow upward and the additive would form a layer on the solution 80 in the column 48. However, in FIG. 2, it is assumed that no additive has been collected.

Figure 3:
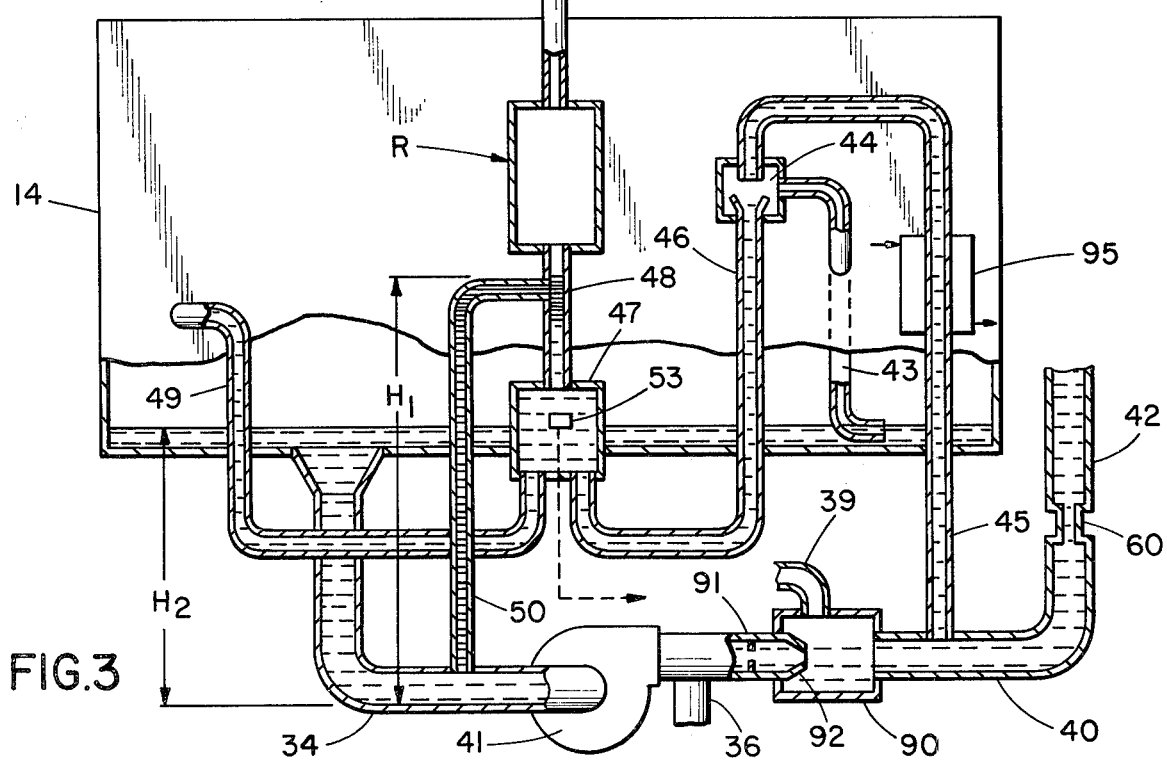

Referring to FIG. 3, and assuming that no noncondensible vapors have built up, it is seen that some of the liquid additive 82 has separated from the solution 80. Since the additive is lighter than the solution, the additive tends to raise the level in the separating column 48. As more additive is collected, the level continues to rise and would enter the receiver R. The receiver is capable of holding a considerable volume of additive, and could completely deplete the additive in the active part of the system. Since this condition is undesirable, additive overflow conduit 50 is provided to prevent the rise of additive into the receiver. In this respect, it is necessary that the dimension $H_1$, relating to this conduit 50, must be appreciably greater than the dimension $H_2$, relating to the solution level in the absorber shell 14.

Figure 4:
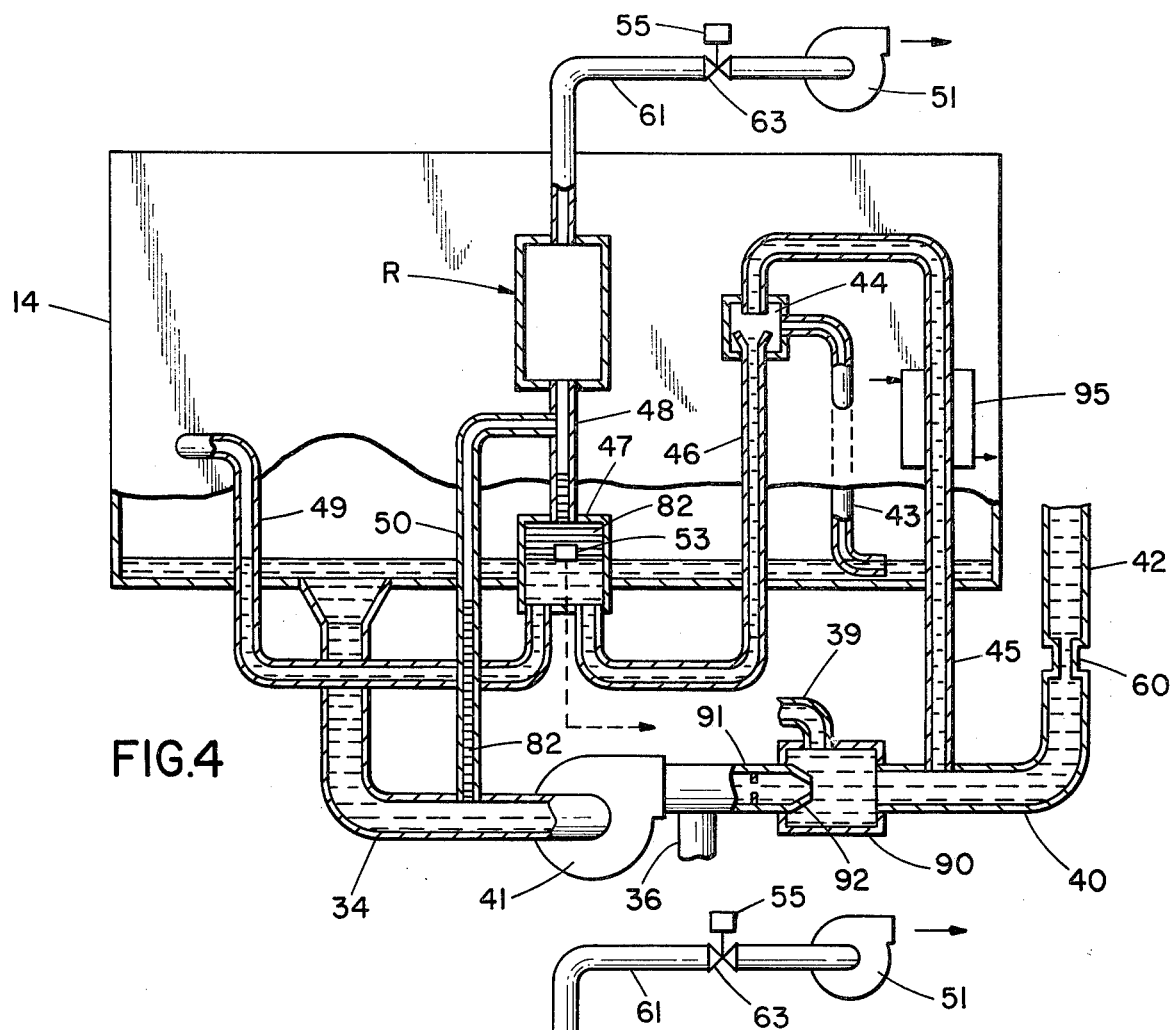

FIG. 4 illustrates the condition of the purge arrangement and its operation when both the noncondensible vapors and the additive have been collected. At this time, the levels of the solution (or combination of solution and additive) in the separation chamber 47 are now depressed, from that shown in FIG. 3, in relation to the outlet level of conduit 49. It will be noted that there is no overflow of additive through conduit 50, but some additive still remains in the conduit from the operation shown in FIG. 3. As the noncondensible vapors continue to collect in the receiver R and pressure increases, a reduction in level in the separation chamber occurs and, eventually, the float switch 53 is activated, which automatically causes purging to take place by the float switch closing a circuit (FIG. 1) to energize the motor 52 of the pump 51, the circuit including conductor 57, pump motor 52 and conductor 58, the conductors 57 and 58 being connected to a source of electricity, $L_1$ and $L_2$. After starting the pump, a time delay relay 56 can close several minutes later, to energize a solenoid 55 to open valve 63 automatically. A timer 59 can be electrically energized to complete the circuit to continue purge pump operation for a predetermined time period, after which the circuit is interrupted and solenoid 55 is deenergized to cause closing of valve 63 to be followed later by deenergizing of the pump motor 52. The described sequential operation of the solenoid valve and purge pump assures the purge pump has pumped down before the solenoid valve opens, and permits the pump to operate on the scavenging operation, after the solenoid valve has closed, to remove water from the pump oil. As an alternate method of operation, automatic purging could be made to occur during the shutdown dilution cycle, or periodically by employing a time clock.

Figure 5:
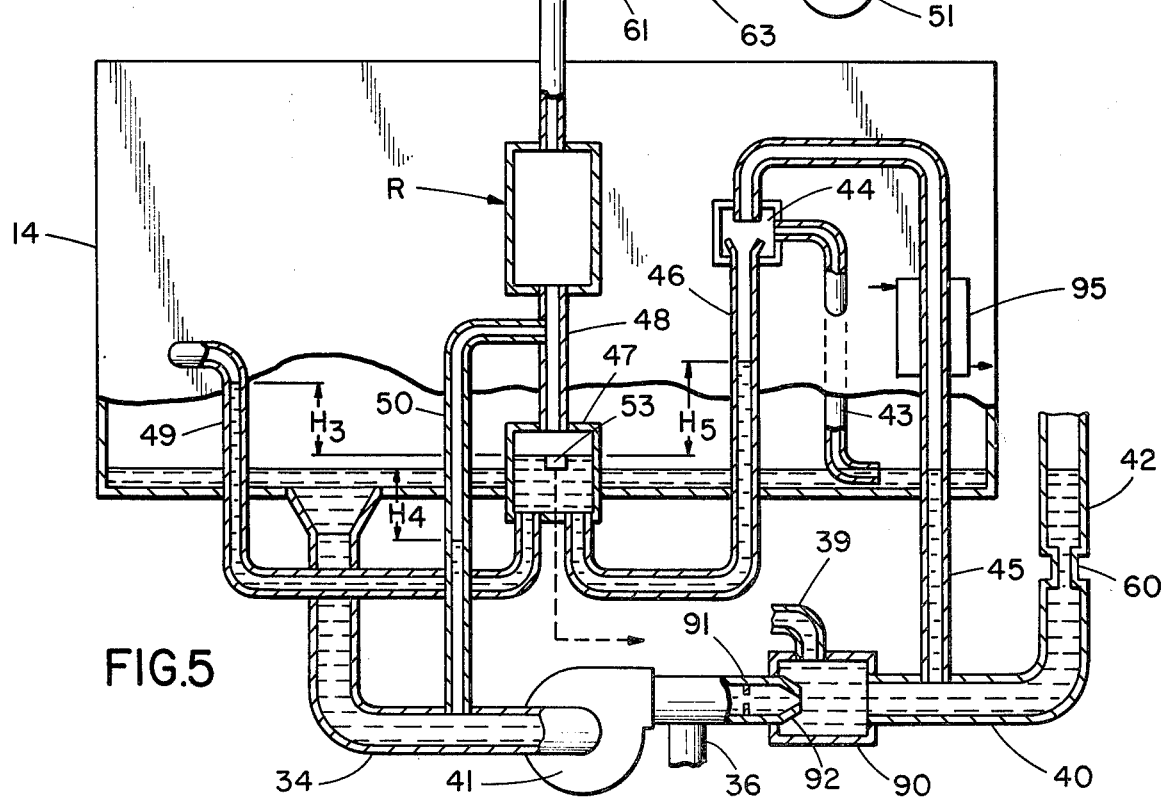

FIG. 5 shows the condition of the purge arrangement upon shutdown of the absorption refrigeration system. Assuming noncondensible vapors are contained in the system at the time of shutdown, these vapors are prevented from returning to the absorber by the use of traps in all conduits. $H_3$ shows the trap feature in conduit 49 which prevents gas escape by this route. $H_4$ shows the trap feature which prevents the escape of gas in the additive overflow conduit 50. $H_5$ shows the trap feature which prevents escape of gas backward through conduit 46. Thus, the noncondensible gases are contained in the receiver R during shutdown of the system, to be removed at the next operation of the system.

When the system is arranged for automatic purging, with automatic operation of the solenoid valve 63 and purge pump 51, this system can prevent against the possibility of solenoid valve leakage causing harmful results. Assuming the solenoid valve should leak, noncondensible vapors would built up in the receiver R, the solution would be depressed in the separation chamber 47 causing the float switch 53 to be activated, and the purge pump motor would be automatically started to remove any such in-leakage during the system shutdown.

The system described herein has made reference to the use of octyl alcohol as a heat transfer additive but this is meant only as an example of many volatile composition which may be used to augment heat transfer in an absorption machine. Also, while this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In an absorption refrigeration machine including a generator, a condenser, an evaporator, and an absorber interconnected to form a closed system containing an absorbent solution, a refrigerant, and an undissolved liquid fraction of an additive effective to increase the refrigeration capacity of the machine, liquid passage means connected to said absorber and providing a closed circuit for flow of absorbent solution and additive through said machine, and vapor passage means for flow of noncondensible vapor from the absorber, and a purge arrangement for exhausting noncondensible vapors from the machine, said purge arrangement comprising:

means defining a chamber for separating noncondensible vapors from said solution, said chamber being adapted to separate said additive from said solution, said additive being relatively volatile and having a lower specific gravity than said absorbent solution and tending to accumulate above the solution in the chamber;

first conduit means having a first section connecting said liquid passage means to said chamber for diverting a portion of the solution flowing in said liquid passage means to said chamber and a second section connecting said chamber to said absorber;

means for expelling separated noncondensible vapors from said system and including a receiver disposed above said chamber for receiving and holding said separated vapors prior to removal from said machine; second conduit means connecting said chamber to said receiver for flow of separated vapors therebetween, said second conduit means being adapted to conatin liquid additive separated from said solution in said chamber;

means inducing flow of noncondensible vapor through said vapor passage means to said separation chamber by flow of solution through said first conduit means and entrainment of the vapor with the flowing solution; and third conduit means connecting said second conduit means to said liquid passage means to pass liquid additive, collecting in said second conduit means, directly to said liquid passage means thereby to inhibit collection of liquid additive in said compartment.

2. The absorption refrigeration machine according to claim 1 in which said vapor flow-inducing means includes an eductor device employing the flowing solution as the motivating force for suction of the vapor from said absorber to said chamber.

3. The absorption refrigeration machine according to claim 1 in which said third conduit means extends vertically downwardly to connect with said liquid passage means for directing additive, overflowing said chamber, into said liquid passage means.

4. The absorption refrigeration machine according to claim 3 in which said liquid passage means includes a solution pump, and said third conduit means is connected to said liquid passage means upstream of said pump, and said first conduit means is connected to said liquid passage means downstream of the pump.

5. The absorption refrigeration machine according to claim 1 in which said first conduit means has a portion extending between said chamber and said absorber with its open terminal end being connected to said absorber above the level of its open terminal end connected to said chamber to increase the vapor pressure in the compartment appreciably above the vapor pressure in said absorber.

6. The absorption refrigeration machine defined in claim 1 in which said chamber is positioned relative to said absorber and said first, second and third conduit means to provide a liquid level above the liquid level of said absorber; and a first portion of said first conduit means extends upwardly of said liquid passage means and above the liquid level in said absorber and said chamber and then downwardly to said flow-inducing means and thereafter upwardly to and terminating in said chamber for passage of liquid solution and additive into the bottom of said chamber, and a second portion of said first conduit means is connected to the bottom of said chamber and extends upwardly above the level of the liquid in said chamber and said absorber and terminates in said absorber; said first and second portions of said first conduit means being operative to trap solution upon shutdown of the machine to seal against the return flow of noncondensible vapors from said chamber into said absorber.

7. The absorption refrigeration machine defined in claim 6 in which said third conduit means has an upper terminal end connected to said second conduit means and disposed above the level of the liquid in said absorber and said chamber, said third conduit means extending downwardly from its connection to said second conduit means below the level of the liquid in the chamber and absorber and having a lower terminal end connected to said liquid passage means, to trap solution, upon shutdown of the machine, to seal against the return flow of noncondensible vapors from said chamber and compartment into said absorber.

8. The absorption refrigeration machine according to claim 1 in which a purge pump is connected to said compartment for removal of noncondensible vapors from said machine, and check valve means prevents flow of ambient air through said pump and into said compartment when said pump is inoperative.

9. The absorption refrigeration machine according to claim 8 including means controlling operation of said purge pump and including sensing means responsive to the level of the solution in said compartment to initiate operation of said purge pump.

10. The absorption refrigeration machine according to claim 9 in which said sensing means includes a float in said compartment and a switch operable thereby, a solenoid for operating said check valve means, and a motor for operating said purge pump, and electric circuit means connecting said switch, said solenoid, and said motor.

* * * * *